United States Patent
Chang et al.

(10) Patent No.: US 7,640,070 B2
(45) Date of Patent: Dec. 29, 2009

(54) REAL-TIME FAULT DETECTION AND CLASSIFICATION SYSTEM IN USE WITH A SEMICONDUCTOR FABRICATION PROCESS

(75) Inventors: Yi-Chun Chang, Hsinchu (TW); Chan-An Pao, Hsinchu (TW); Cheng-Tso Tsai, Hsinchu (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 0 days.

(21) Appl. No.: 11/798,898

(22) Filed: May 17, 2007

(65) Prior Publication Data

US 2008/0154421 A1   Jun. 26, 2008

(30) Foreign Application Priority Data

Dec. 25, 2006   (TW) ............................. 95148694 A

(51) Int. Cl.
  *G06F 19/00* (2006.01)
  *G06F 11/30* (2006.01)
  *G21C 17/00* (2006.01)
(52) U.S. Cl. .................. 700/110; 702/185; 700/121
(58) Field of Classification Search ............. 700/28, 700/108–110, 117–121; 702/182–185; 714/25, 714/47, 48
See application file for complete search history.

(56) References Cited

U.S. PATENT DOCUMENTS

| | | | |
|---|---|---|---|
| 5,657,252 A * | 8/1997 | George | 702/83 |
| 6,836,691 B1 | 12/2004 | Stirton | |
| 7,082,345 B2 * | 7/2006 | Shanmugasundram et al. | 700/121 |
| 7,146,237 B2 * | 12/2006 | Lev-Ami et al. | 700/121 |
| 7,151,976 B2 * | 12/2006 | Lin | 700/108 |
| 7,162,394 B2 * | 1/2007 | Cheng et al. | 702/184 |
| 7,171,897 B2 * | 2/2007 | Barajas et al. | 101/129 |
| 7,174,230 B2 * | 2/2007 | Arackaparambil et al. | 700/96 |
| 7,404,207 B2 * | 7/2008 | Perry | 726/15 |
| 7,467,018 B1 * | 12/2008 | Callaghan | 700/1 |
| 2004/0054642 A1 * | 3/2004 | Chen | 707/1 |
| 2005/0010311 A1 * | 1/2005 | Barbazette et al. | 700/78 |
| 2005/0216579 A1 * | 9/2005 | Yang et al. | 709/223 |

(Continued)

FOREIGN PATENT DOCUMENTS

CN   10-1211168 A  *  7/2008

(Continued)

*Primary Examiner*—M. N. Von Buhr
(74) *Attorney, Agent, or Firm*—Rabin & Berdo, P.C.

(57) ABSTRACT

A real-time fault detection and classification (FDC) system, which is in use with a semiconductor fabrication process having a first sub-fabrication process and a second sub-fabrication process, includes a computer integrated manufacturing (CIM) host adopting a SEMI equipment communication standard (SECS), a semiconductor tool for executing the first sub-fabrication process and generating first status data in conformity with the SECS, a non-semiconductor tool for executing the second sub-fabrication process and generating second status data in conformity with a predetermined connectivity standard different from the SECS, and a tool simulator connecting the tool simulator with the semiconductor tool and the non-semiconductor tool for receiving the first and second status data and transforming the second status data into third status data in conformity with the SECS such that the CIM host can classify the first and third status data according to a predetermined classification technique and get a control over equipment health conditions of the semiconductor tool as well as the non-semiconductor tool.

9 Claims, 2 Drawing Sheets

U.S. PATENT DOCUMENTS

| | | | |
|---|---|---|---|
| 2006/0064440 A1* | 3/2006 | Perry | 707/200 |
| 2006/0095545 A1* | 5/2006 | Dreyer et al. | 709/220 |
| 2006/0106921 A1* | 5/2006 | Sim et al. | 709/223 |
| 2007/0094548 A1* | 4/2007 | Lev-Ami et al. | 714/47 |
| 2007/0142950 A1* | 6/2007 | Okita | 700/108 |
| 2007/0150235 A1* | 6/2007 | Lev-Ami et al. | 702/182 |
| 2007/0260410 A1* | 11/2007 | Raymond | 702/81 |
| 2008/0125898 A1* | 5/2008 | Harvey et al. | 700/110 |

FOREIGN PATENT DOCUMENTS

| | | | |
|---|---|---|---|
| KR | 2004-052880 A | * | 6/2004 |

\* cited by examiner

REAL-TIME FAULT DETECTION AND CLASSIFICATION SYSTEM IN USE WITH A SEMICONDUCTOR FABRICATION PROCESS

BACKGROUND OF THE INVENTION

1. Field of the Invention

The present invention relates generally to a semiconductor fabrication process, and more particularly to a real-time fault detection and classification system in use with a semiconductor fabrication process.

2. Description of Related Art

In order to keep competitive manufacturing ability, semiconductor manufacturers are decreasing manufacturing cost of semiconductor components by 25-30% each year. As pointed out by International Technology Roadmap for Semiconductors (ITRS), four possible methods for reducing manufacturing cost include reducing feature sizes, increasing wafer diameter, improving product yield and increasing overall equipment effectiveness (OEE). As to current semiconductor technology, increasing wafer diameter and improving product yield can at most reduce 3% of the manufacturing cost, and decreasing feature sizes can reduce about 12% to 14% of the manufacturing cost. However, according to an estimation of the Semiconductor Manufacturing Technology Consortium (SEMATECH), equipment efficiency of semiconductor manufacturers only reaches 40-50%. Therefore, to decrease the manufacturing cost by 25-30% each year, the overall equipment efficiency should be improved for decreasing the manufacturing cost by 9-15% instead of 3-10%. It can be expected that in the near future increasing the overall equipment efficiency will play a key role in semiconductor fabrication processes.

To increase the overall equipment efficiency, international semiconductor manufacturers and research institutes such as AMD, IBM, INTEL, MOTOROLA, OAK, SAMSUNG, TI and SEMATECH have made R&D on factory and metrology integration system and automation monitoring system, particularly advanced process control (APC) technique, e.g. U.S. Pat. No. 6,836,691 entitled "Method and Apparatus for Filtering Metrology Data Based on Collection Purpose" and proposed by AMD. The APC technique mainly comprises functions of data collection and data pre-process, fault detection and classification (FDC) and feedback/feed forward run-to-run control (R2R), through which unexpected equipment stop times can be reduced and real-time fault detection on semiconductor tools can be facilitated, thus decreasing occurrence of defective products and protecting quality of semiconductor components from being affected by drifting of features of the semiconductor tools.

As shown in FIG. 1, a conventional fault detection and classification system 1 comprises a computer integrated manufacturing (CIM) host 11, a semiconductor tool 13 and a facility monitoring control system (FMCS) 14. Therein, both the CIM host 11 and the semiconductor tool 13 adopt the SEMI equipment communication standard (SECS) set by the Semiconductor Equipment and Material International (SEMI), while status data received by the facility monitoring control system 14 is in conformity with object linking and embedded (OLE) or open database connectivity (ODBC). Therefore, workers on the CIM host 11 need to master both the SECS and the OLE or ODBC at the same time for analyzing the status data transferred by the semiconductor tool 13 and the facility monitoring control system 14 so as to correctly determine equipment health conditions of the semiconductor tool 13 and the facility monitoring control system 14.

Moreover, in the conventional fault detection and classification system 1, the CIM host 11 can only passively receive status data transferred from the semiconductor tool 13 and the facility monitoring control system 14. In other words, the semiconductor tool 13 or the facility monitoring system 14 may be already abnormal before the CIM host 11 receives status data of the semiconductor tool 13 or the facility monitoring system 14. Therefore, workers on the fault detection and classification system 1 cannot timely maintain the semiconductor tool 13 or the facility monitoring control system 14. Accordingly, semiconductor fabrication processes using the conventional fault detection and classification system 1 can result in a poor product yield.

SUMMARY OF THE INVENTION

According to the above drawbacks, an objective of the present invention is to provide a fault detection and classification (FDC) system in use with a semiconductor fabrication process for increasing product yield of the semiconductor fabrication process.

In order to attain the above and other objectives, the present invention discloses a real-time fault detection and classification system in use with a semiconductor fabrication process having a first sub-fabrication process and a second sub-fabrication process. The real-time fault detection and classification system comprises: a semiconductor tool for executing the first sub-fabrication process and generating first status data in conformity with the SEMI equipment communication standard (SECS); a non-semiconductor tool for executing the second sub-fabrication process and generating second status data in conformity with a predetermined connectivity standard different from the SECS; a tool simulator connected between the semiconductor tool and the non-semiconductor tool for receiving the first status data generated by the semiconductor tool and the second status data generated by the non-semiconductor tool and transforming the second status data into third status data in conformity with the SECS; and a computer integrated manufacturing (CIM) host adopting the SECS, which is connected with the tool simulator for receiving the first and third status data and classifying the first and third status data according to a predetermined classification technique so as to determine equipment health conditions of the semiconductor tool as well as the non-semiconductor tool.

According to another embodiment of the present invention, the semiconductor fabrication process comprises a first sub-fabrication process, the real-time fault detection and classification system comprises: a computer integrated manufacturing (CIM) host adopting the SEMI equipment communication standard (SECS), which is used to send a SECS control instruction; and a semiconductor tool, which is used to execute the first sub-fabrication process, generate first status data in conformity with the SECS, and transfer the first status data to the CIM host according to the SECS control instruction; wherein, when receiving the first status data, the CIM host classifies the first status data according to a predetermined classification technique so as to determine equipment health condition of the semiconductor tool.

DETAILED DESCRIPTION OF PREFERRED EMBODIMENTS

The following illustrative embodiments are provided to illustrate the disclosure of the present invention, these and other advantages and effects can be apparent to those skilled in the art after reading the disclosure of this specification. The present invention can also be performed or applied by other different embodiments. The details of the specification may be on the basis of different points and applications, and numerous modifications and variations can be made without departing from the spirit of the present invention.

Figure 1:
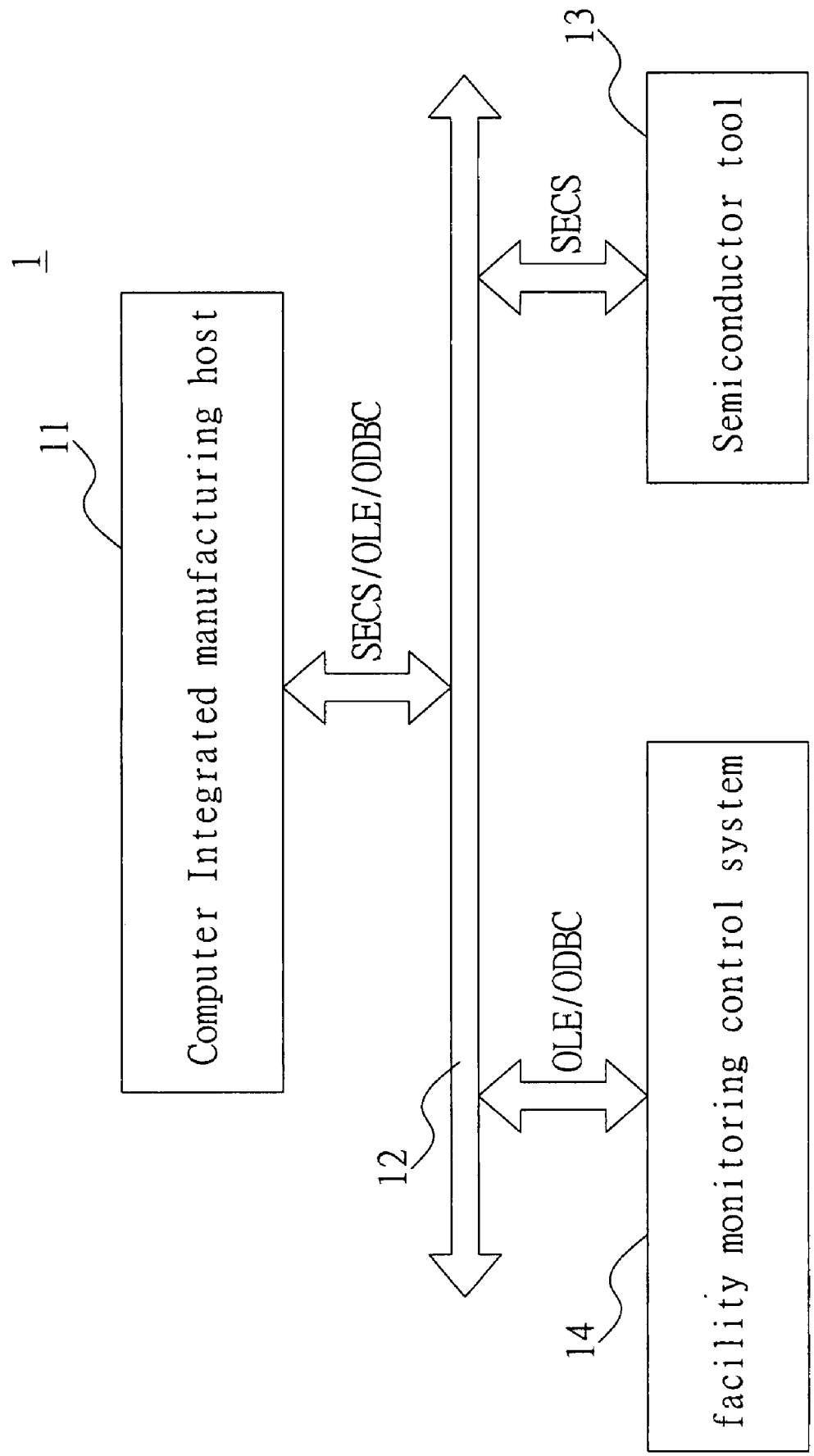
FIG. 1 is a block diagram of a conventional fault detection and classification system.
Figure 2:
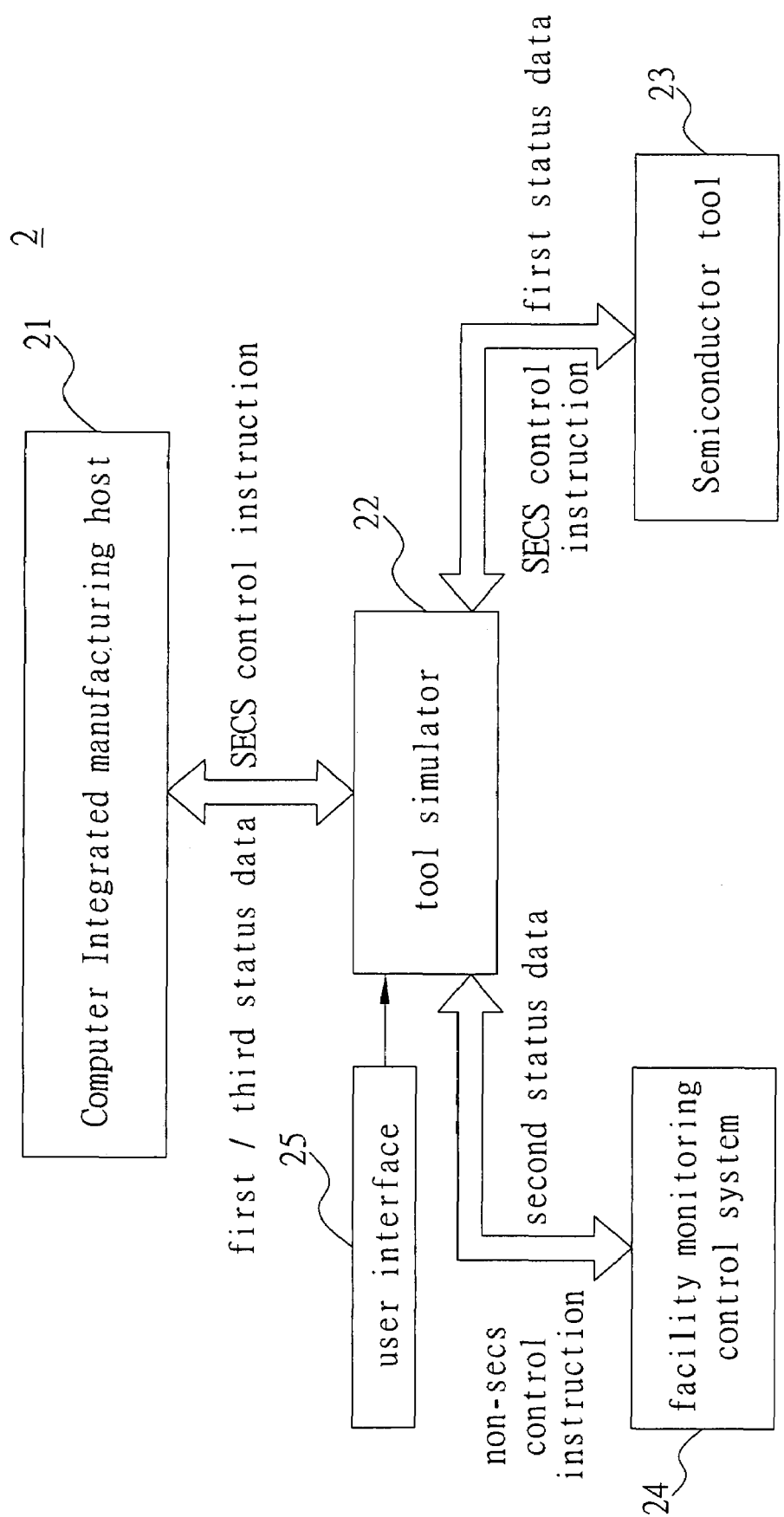
FIG. 2 is a block diagram of a real-time fault detection and classification system according to a preferred embodiment of the present invention.

FIG. 2 is a block diagram of a real-time fault detection and classification system 2 in use with a semiconductor fabrication process according to a preferred embodiment the present invention, wherein the semiconductor fabrication process comprises a first sub-fabrication process and a second sub-fabrication process. The real-time fault detection and classification system 2 comprises a computer integrated manufacturing (CIM) host 21, a semiconductor tool 23, a facility monitoring control system (FMCS) 24, and a tool simulator 22 connected between the CIM host 21 and the semiconductor tool 23 as well as the facility monitoring control system 24.

The CIM host 21 adopts the SEMI equipment communication standard (SECS). The semiconductor tool 23 is used to execute the first sub-fabrication process and generate first status data in conformity with the SECS. The facility monitoring control system 24 is used to execute the second sub-fabrication process and generate second status data in conformity with a predetermined connectivity standard such as object linking and embedded (OLE) and open database connectivity (ODBC). As the FMCS 24 is in conformity with a predetermined connectivity standard different from the SECS conformed by the semiconductor tool 23, the facility monitoring control system 24 can be thought as a non-semiconductor tool different from any semiconductor tools. The tool simulator 22 receives the first status data generated by the semiconductor tool 23 and the second status data generated by the facility monitoring control system 24, transforms the second status data in conformity with the predetermined connectivity standard into third status data in conformity with the SECS, and transfers the first and third status data to the CIM host 21. When receiving the first and third status data, the CIM host 21 classifies the first and third status data according to a predetermined classification technique so as to determine equipment health conditions of the semiconductor tool 23 and the facility monitoring control system 24. As the tool simulator 22 can transform the second status data that is not conformed with the SECS into the third status data in conformity with the SECS, workers on the CIM host 21 only need to master the SECS without the need of learning additional connectivity standards so as to correctly determine equipment health conditions of the semiconductor tool 23 and the facility monitoring control system 24 according to the first and third status data in conformity with the SECS. That is, due to the tool simulator 22 of the real-time fault detection and classification system 2, a non-semiconductor tool such as the facility monitoring control system 24 that is not conformed with the SECS can be simulated as a semiconductor tool in conformity with the SECS by the CIM host 21.

According to a preferred embodiment, the predetermined classification technique is a statistical process control (SPC) technique. In addition, although the real-time fault detection and classification system 2 of the present embodiment comprises a semiconductor tool 23 and a non-semiconductor tool (facility monitoring control system 24), it is not limited thereto. In other embodiments, the real-time fault detection and classification system 2 can comprise a plurality of semiconductor tools and a plurality of non-semiconductor tools, wherein the non-semiconductor tools can further comprise mechanical computer-aided design (MCAD). Accordingly, the predetermined connectivity standard can be web service description language (WSDL). The tool simulator 22 can transform the second status material in conformity with the WSDL into third status data in conformity with the SECS such that workers on the CIM host 21 can analyze the third status data even if they do not understand the WSDL and thereby correctly determine equipment health conditions of the non-semiconductor tools.

According to a preferred embodiment, the semiconductor tool 23 and the facility monitoring control system 24 periodically send the first and second status data to the tool simulator 22. In other words, the CIM host 21 can passively receive the first and third status data from the tool simulator 22. Alternatively, the CIM host 21 can actively obtain the first and third status data. In particular, the CIM host 21 sends a SECS control instruction to the tool simulator 22 and the tool simulator 22 further transfers the SECS control instruction to the semiconductor tool 23. After receiving the SECS control instruction, the semiconductor tool 23 sends the first status data to the CIM host 21 through the tool simulator 22. Thus, the CIM host 21 can obtain the first status data generated by the semiconductor tool 23 at any time for further determining equipment health condition of the semiconductor tool 23. Further, after receiving the SECS control instruction, the tool simulator 22 can transform the SECS control instruction into a non-SECS control instruction in conformity with OLE/ODBC (the predetermined connectivity standard) and then transfer the non-SECS control instruction to the facility monitoring control system 24. When receiving the non-SECS control instruction, the facility monitoring control system 24 sends second status data to the tool simulator 22. The tool simulator 22 then transforms the second status data into third status data and transfers the third status data to the CIM host 21. As a result, the CIM host 21 can determine equipment health condition of the facility monitoring control system 24 at any time.

The real-time fault detection and classification system 2 of the present invention can further comprise a user interface 24, and the facility monitoring control system 24 can comprise a plurality of control options, wherein each control option is used to control parameter settings such as temperature, humidity, acid/alkali offering. Workers on the facility monitoring control system 24 can select part of the control options through the user interface 25 for generating second status data. In other words, workers can keep parameters of the remaining control options from being known by the CIM host 21.

Although the SECS is a connectivity standard between the CIM host 21 and the semiconductor tool 23, it is not certain that the semiconductor tool 23 will utilize the whole SECS. Thus, in order to save R&D expenses, all control options of the facility monitoring control system 24 are conformed with the generic equipment model (GEM) specification provided by the Global Information & Control Committee in 1992, and the SECS control instruction sent by the CIM host 21 is conformed with the GEM specification. In other words, the facility monitoring control system 24 comprises functions such as connection establishment, remote control, process program management, material transportation and time provision.

Compared with the prior art, since the real-time fault detection and classification system 2 of the present invention has a tool simulator 22, the status data such as the first and third status data received by workers on the CIM host 21 is conformed with the SECS. In other words, workers on the CIM host 21 only need to master the SECS for determining equipment health conditions of the semiconductor tools and non-semiconductor tools of the real-time fault detection and classification system 2. Further, the CIM host 21 not only can passively receive the status data from the semiconductor tool 23 and the facility monitoring control system 24 periodically but also can actively and timely obtain the status data by sending a SECS control instruction. Furthermore, as all control options of the facility monitoring control system 24 are conformed with the GEM specification and all SECS control instructions sent by the CIM host 21 are conformed with the GEM specification, the R&D expenses of the tool simulator 22 are rather lower.

The above-described descriptions of the detailed embodiments are only to illustrate the preferred implementation according to the present invention, and it is not to limit the scope of the present invention, Accordingly, all modifications and variations completed by those with ordinary skill in the art should fall within the scope of present invention defined by the appended claims.

What is claimed is:

1. A real-time fault detection and classification (FDC) system in use with a semiconductor fabrication process comprising a first sub-fabrication process, the real-time fault detection and classification system comprising:

a computer integrated manufacturing (CIM) host adopting the SEMI equipment communication standard (SECS), which is used to send a SECS control instruction;

a semiconductor tool, which is used to execute the first sub-fabrication process, generate first status data in conformity with the SECS, and transfer the first status data to the CIM host according to the SECS control instruction;

a non-semiconductor tool, which is used to execute the second sub-fabrication process and according to a non-SECS control instruction transformed from the SECS control instruction and being in conformity with a predetermined connectivity standard different from the SECS, generate second status data in conformity with the predetermined connectivity standard;

a tool simulator connected between the CIM host and the semiconductor tool as well as the non-semiconductor tool, which is used to transfer the SECS control instruction of the CIM host to the semiconductor tool, transform the SECS control instruction to a non-SECS control instruction and send the non-SECS control instruction to the non-semiconductor tool, receive the first status data generated by the semiconductor tool and the second status data generated by the non-semiconductor tool, transform the second status data into third status data in conformity with the SECS, and transfer the first and third status data to the CIM host;

wherein, after receiving the first and third status data, the CIM host classifies the first and third status data according to a predetermined classification technique so as to determine equipment health condition of the semiconductor tool and the non-semiconductor tool.

2. The system of claim 1, wherein the semiconductor tool periodically sends first status data to the CIM host through the tool simulator.

3. The system of claim 1, wherein the semiconductor tool comprises a plurality of control options in conformity with the generic equipment model (GEM) specification, each control option is used to generate the first status data, and the SECS control instruction sent by the CIM host is in conformity with the GEM specification.

4. The system of claim 1, wherein the non-semiconductor tool is a facility monitoring control system (FMCS) comprising functions of connection establishment, remote control, process program control and time provision.

5. The system of claim 1, wherein the non-semiconductor tool is mechanical computer-aided design (MCAD), and the predetermined connectivity standard is web service description language (WSDL).

6. The system of claim 1, wherein the non-semiconductor tool is a facility monitoring control system (FMCS), and the predetermined connectivity standard is one of object linking and embedded (OLE) and open database connectivity (ODBC).

7. The system of claim 6 further comprising a user interface, wherein, the facility monitoring control system comprises a plurality of control options and the user interface is used to select part of the control options for generating second status data.

8. The system of claim 7, wherein each of the control options is used to control parameter settings of temperature, humidity, acid and alkali offering in a semiconductor factory where the facility monitoring control system is located.

9. The system of claim 1, wherein the predetermined classification technique is a statistical process control (SPC) technique.

* * * * *